United States Patent [19]
Vincent et al.

[11] Patent Number: 6,028,823
[45] Date of Patent: Feb. 22, 2000

[54] GEODETIC POSITION ESTIMATION FOR UNDERWATER ACOUSTIC SENSORS

[75] Inventors: Harold T. Vincent, North Kingstown; Sau-Lon J. Hu, Providence, both of R.I.

[73] Assignee: The United States of America as represented by the Secretary of the Navy, Washington, D.C.

[21] Appl. No.: 09/203,934

[22] Filed: Dec. 2, 1998

[51] Int. Cl.$^7$ .................................................. G01V 1/32
[52] U.S. Cl. ................................ 367/63; 367/43; 367/73
[58] Field of Search ................................ 367/93, 63, 38, 367/59, 43, 73; 364/421

[56] References Cited

U.S. PATENT DOCUMENTS

| | | | |
|---|---|---|---|
| 4,628,492 | 12/1986 | Winney | 367/63 |
| 4,779,238 | 10/1988 | Howard | 367/63 |

OTHER PUBLICATIONS

Shahriar Negahdaripour (Undersea Optical stationkeeping improved method) Dec. 14, 1990; pp. 321–337.

*Primary Examiner*—Christine K. Oda
*Assistant Examiner*—Anthony Jolly
*Attorney, Agent, or Firm*—Michael J. McGowan; Robert W. Gauthier; Prithvi C. Lall

[57] ABSTRACT

A system and survey method for estimating the geodetic position of acoustic sensors placed at fixed but unknown locations on the seafloor is disclosed. Bottom mounted sensors are surveyed using an extension of the well known trilateration survey technique, i.e., making ranging measurements from reference points to the point to be surveyed. For acoustic sensors, these ranging measurements are obtained by transmitting an acoustic signal from a near surface projector and making corresponding timing and/or position measurements, requiring calculation of the Effective Sound Velocity. Bias errors are precluded from propagating to the sensor coordinates by considering timing and sound velocity biases, in addition to the sensor coordinates, as parameters to be estimated.

6 Claims, 3 Drawing Sheets

6,028,823

GEODETIC POSITION ESTIMATION FOR UNDERWATER ACOUSTIC SENSORS

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to a system and method for estimating the geodetic position of acoustic sensors, and more particularly to a system and method for estimating position which considers timing and sound velocity biases as parameters to be estimated, thus precluding biasing errors from propagating to the sensor coordinates.

(2) Description of the Prior Art

Underwater acoustic tracking ranges, as typically operated, utilize the well known principle of hyperbolic multilateration similar to radio frequency (RF) navigation systems. The accuracy and limitations of these systems has been well documented. The underwater acoustic environment, however, creates some unique differences. For example, both the RF and acoustic systems make timing measurements and convert them to range measurements. The nature of underwater acoustic wave propagation results in non-dispersive wave propagation, significantly smaller propagation velocities, shorter propagation distances, longer transit times and severe refraction through the stratified ocean. In addition, both types of tracking systems require precise knowledge of the relative and geodetic location of the reference sensors (transmitters and receivers). For a land based RF system, this is accomplished using well known, conventional terrestrial survey techniques. For a satellite based RF system, it requires techniques adapted for that environment. Historically, two methods have been employed for surveying underwater acoustic sensors, commonly referred to as the Vanderkulk and Spherical Least Squares methods, the main difference between the two methods being the use of geodetic position information for the acoustic sources. However, both techniques are extensions of the conventional, well known trilateration survey technique. A trilateration survey consists of making range measurements from reference points to points to be surveyed. The ranging measurements are obtained by making timing measurements and converting them to range measurements based upon a presumed knowledge of the propagation velocity of the transmitted acoustic signal. The major source of error for the traditional survey methods is systematic error or bias. This type of error can manifest itself both in the timing measurements and in the assumptions of the sound velocity. Timing biases are normally removed by making system timing measurements and removing the systematic component before processing, the systemantic component normally being a timing delay. Systematic errors in the acoustic propagation velocity, however, are more difficult to deal with because they cannot be measured and are generally functions of both space and time. For underwater acoustic multilateration tracking systems, the nature of the acoustic propagation is such that ray theory is considered valid. If one further restricts the propagation to direct monotonic acoustic ray paths, the propagation velocity is characterized by an Effective Sound Velocity (ESV). The ESV is that velocity which when multiplied by the transit time between two underwater points, yields the geometric or slant range between them. To avoid systematic (non-random) errors in the ESV calculation, an unbiased measurement for the Sound Speed Profile (SSP) is prerequisite. However, a typical measured SSP may have a 2 meter/second bias error. Consequently, the traditional methods may suffer significant errors on estimating the sensor coordinates.

SUMMARY OF THE INVENTION

Accordingly, it is an object of the present invention to provide a system and method which can be used to more accurately estimate the geodetic position of acoustic sensors.

Another object of the present invention is to provide a system and method for estimating the geodetic position of acoustic sensors which considers timing and sound velocity biases as parameters to be estimated.

Still another object of the present invention is to provide system and method for estimating the geodetic position of acoustic sensors which precludes biasing errors from propagating to the sensor coordinates.

Other objects and advantages of the present invention will become more obvious hereinafter in the specification and drawings.

In accordance with the present invention, a system and survey method for estimating the geodetic position of acoustic sensors placed at fixed but unknown locations on the seafloor is disclosed. Bottom mounted sensors are surveyed using an extension of the well known trilateration survey technique, i.e., making ranging measurements from reference points to the point to be surveyed. For acoustic sensors, these ranging measurements are obtained by transmitting an acoustic signal from a near surface projector and making corresponding timing and/or position measurements, requiring calculation of the Effective Sound Velocity. Bias errors are precluded from propagating to the sensor coordinates by considering timing and sound velocity biases, in addition to the sensor coordinates, as parameters to be estimated.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings wherein corresponding reference characters indicate corresponding parts throughout the several views of the drawings and wherein.

DESCRIPTION OF THE PREFERRED EMBODIMENT

Figure 1:
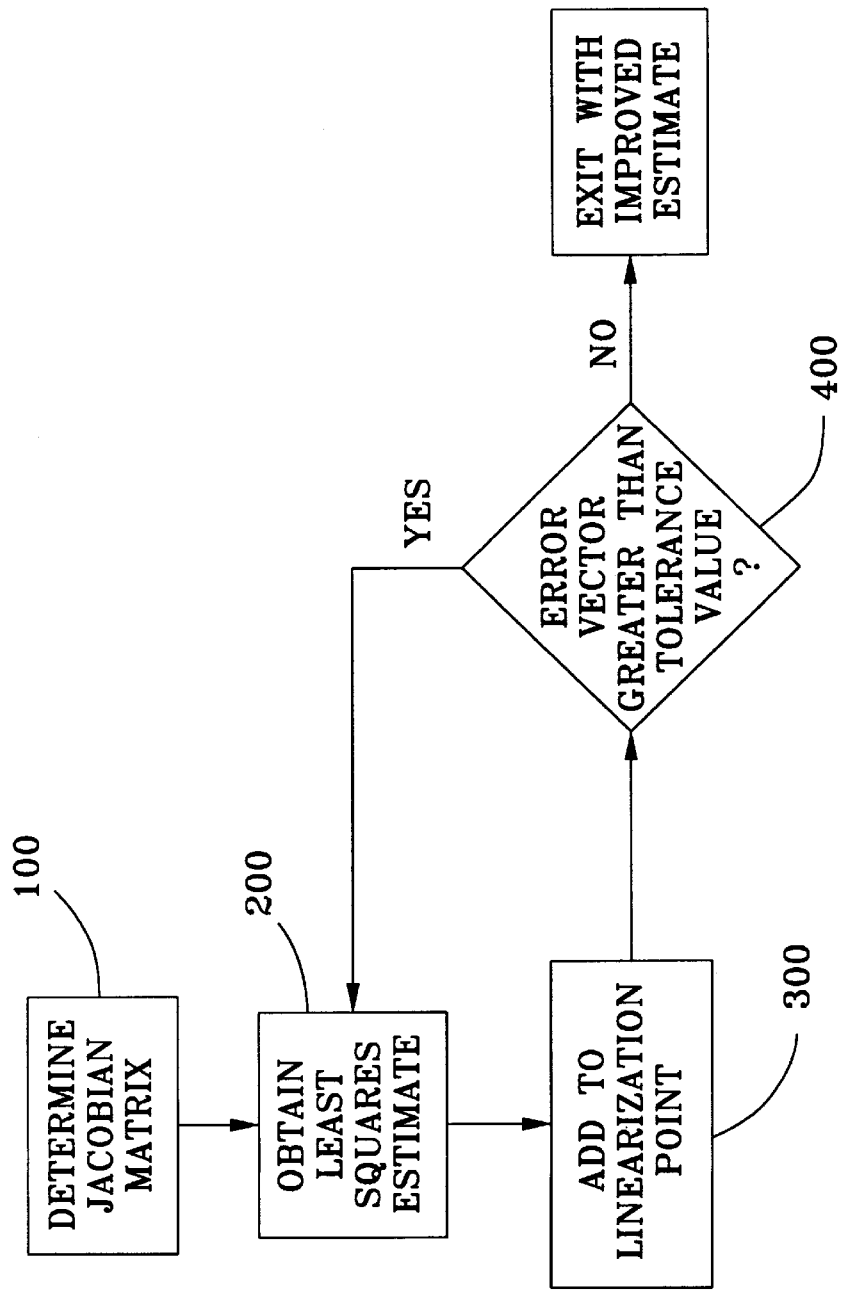
FIG. 1 is a flow chart of the method of the present invention.

To formulate the geodetic position estimation problem for underwater acoustic sensors, prior art methods utilize a spherical positioning model given by:

$$R_i = c_i(t_i^a - t_i^e); i=1 \ldots N, \quad (1)$$

where $R_i$ is the geometric slant range between the source and receiver such that $$R_i = \sqrt{(x-x_i)^2 + (y-y_i)^2 + (z-z_i)^2}. \quad (2)$$

The source coordinates are denoted $\{x_i, y_i, z_i\}$ and the sensor coordinates (to be estimated) are denoted $\{x, y, z\}$. The ESV is denoted $c_i$ and the arrival times and emission times of the acoustic signal are denoted $t_i^a$ and $t_i^e$, respectively. Under the assumption of a stratified sound velocity medium, $c_i$ is calculated as a function of $z$, $z_i$ and the horizontal distance $$H_i = \sqrt{(x-x_i)^2 + (y-y_i)^2}.$$

Technically the depth of the source and receiver is used vice the tangent plane z, careful consideration must be given to geodetic and Cartesian coordinate systems and their transformations. When a direct, monotonic ray tracing method is followed, the value of $c_i$ can be uniquely determined based on the measured (SVP). If an additional parameter representing an unknown system timing bias $b_t$ is added, the so-called hyperbolic positioning model, used in many well known land based and satellite based methods of position estimation, is created. Any systematic timing errors can now be estimated without propagating to the position estimate of the underwater acoustic sensor. The hyperbolic model is thus:

$$R_i = c_i(t_i^a - t_i^e + b_t); i=1 \ldots N. \quad (3)$$

This positioning model has not normally been employed for acoustic sensor position estimation because one has the ability to synchronize the transmitter and receiver and perform timing measurements so that this term is known a priori. However, the present invention extends the concept further. A fifth parameter representing an unknown effective sound velocity bias $b_c$ is added. Consequently, a new positioning model with effective sound velocity bias estimation is thus:

$$R_i(c_i + b_c)(t_i^a - t_i^e + b_t); i=1 \ldots N. \quad (4)$$

It is noted that higher order terms could be added to the model if the mathematical nature of the ESV error dictates.

The models shown in Eq. (1), (3) and (4) are nonlinear systems of equations. All of the models shown above are nonlinear systems of equations. Eq. (1) contains three parameters to be estimated, namely $(x,y,z)$. Eq. (3) and (4) contain four $(x,y,z,b_t)$ and five $(x,y,z,b_c,b_t)$ parameters, respectively. A common approach to solve this kind of nonlinear problem is based on a well known iterated Newton-Raphson method, suitable for implementation within a computer, as will be explained further hereinafter.

Defining a new variable $t^t$ as the transit time where $t^t = t^a - t^e$ and denoting a reference point $(x_0, y_0, z_0, b_c^0, b_t^0)$ for $(x, y, z, b_c, b_t)$, a direct use of the Taylor series expansion for $t_i^t$ as a function of $(x, y, z, b_c, b_t)$, yields:

$$t_i^t = t_0^t + \frac{\partial t_i^t}{\partial x}\bigg|_0 (x-x_0) + \frac{\partial t_i^t}{\partial y}\bigg|_0 (y-y_0) + \frac{\partial t_i^t}{\partial z}\bigg|_0 (z-z_0) + \quad (5)$$
$$\frac{\partial t_i^t}{\partial b_c}\bigg|_0 (b_c - b_c^0) + \frac{\partial t_i^t}{\partial b_t}\bigg|_0 (b_t - b_t^0),$$

where a super- or sub-script "0" indicates that the value is calculated at the reference point $(x_0, y_0, z_0, b_c^0, b_t^0)$. For instance, $$t_0^t = \frac{R_i^0}{c_i^0 + b_c^0} - b_t^0, \quad (6)$$

in which:

$$R_i^0 = \sqrt{(x_i - x_0)^2 + (y_i - y_0)^2 + (z_i - z_0)^2} \quad (7)$$

and $c_i^0$ is the ESV between $(x_i, y_i, z_i)$ and $(x_0, y_0, z_0)$.

From EQ. (5), one can easily show $$\frac{\partial t_i^t}{\partial b_c}\bigg|_0 = -\frac{R_i^0}{(c_i^0 + b_c^0)^2} \quad (8)$$

and $$\frac{\partial t_i^t}{\partial b_t}\bigg|_0 = -1. \quad (9)$$

Due to the fact that both $R_i$ and $c_i$ are dependent on x, one writes:

$$\frac{\partial t_i^t}{\partial x}\bigg|_0 = \frac{1}{c_i^0 + b_c^0}\left(\frac{\partial R_i}{\partial x}\bigg|_0 - \frac{R_i^0}{c_i^0 + b_c^0}\frac{\partial c_i}{\partial x}\bigg|_0\right). \quad (10)$$

Since $$\frac{\partial R_i}{\partial x}\bigg|_0 = \frac{x_0 - x_i}{R_i^0}, \quad (11)$$

one can rewrite EQ. (10) to be $$\frac{\partial t_i^t}{\partial x}\bigg|_0 = \frac{1}{c_i^0 + b_c^0}\left(\frac{x_0 - x_i}{R_i^0} - \frac{R_i^0}{c_i^0 + b_c^0}\frac{\partial c_i}{\partial x}\bigg|_0\right). \quad (12)$$

Because there is no explicit expression available for $c_i$ as a function of x, one cannot analytically evaluate $$\frac{\partial c_i}{\partial x}\bigg|_0.$$

Therefore, one has to rely on a numerical method to obtain it. One possible way to obtain an approximation for $$\frac{\partial c_i}{\partial x}\bigg|_0$$

is stated below. First, one estimates the ESVs corresponding to the target position at $(x_0 + \epsilon, y_0, z_0)$ and at $(x_0 - \epsilon, y_0, z_0)$, respectively, denoted as $c_i^0(x_0^+)$ and $c_i^0(x_0^-)$, where $\epsilon$ is a small length quantity (say 1 meter). Then, one calculates $$\left.\frac{\partial c_i}{\partial x}\right|_0$$

as:

$$\left.\frac{\partial c_i}{\partial x}\right|_0 = \frac{c_i^0(x_0^+) - c_i^0(x_0^-)}{2\varepsilon}. \tag{13}$$

It is well known in solving Eq. (10) to assume that $$\left.\frac{\partial c_i}{\partial x}\right|_0$$

is negligibly small. This assumption is particularly true where the elevation angle associated with $(x_i, y_i, z_i)$ and $(x_0, y_0, z_0)$ is large. As a result, one can simplify Eq. (12) to be:

$$\left.\frac{\partial t_i^t}{\partial x}\right|_0 = \frac{1}{c_i^0 + b_c^0} \frac{x_0 - x_i}{R_i^0}. \tag{14}$$

Exercising the same mathematics used in deriving Eq. (12), one obtains:

$$\left.\frac{\partial t_i^t}{\partial y}\right|_0 = \frac{1}{c_i^0 + b_c^0}\left(\frac{y_0 - y_i}{R_i^0} - \frac{R_i^0}{c_i^0 + b_c^0}\left.\frac{\partial c_i}{\partial y}\right|_0\right) \tag{15}$$

and $$\left.\frac{\partial t_i^t}{\partial z}\right|_0 = \frac{1}{c_i^0 + b_c^0}\left(\frac{z_0 - z_i}{R_i^0} - \frac{R_i^0}{c_i^0 + b_c^0}\left.\frac{\partial c_i}{\partial z}\right|_0\right), \tag{16}$$

and following the same numerical procedure as in Eq. (13):

$$\left.\frac{\partial c_i}{\partial y}\right|_0 = \frac{c_i^0(y_0^+) - c_i^0(y_0^-)}{2\varepsilon} \tag{17}$$

and $$\left.\frac{\partial c_i}{\partial z}\right|_0 = \frac{c_i^0(z_0^+) - c_i^0(z_0^-)}{2\varepsilon}, \tag{18}$$

where, following the same definitions as given for $c_i^0(x_0^+)$ and $c_i^0(x_0^-)$, $c_i^0(y_0^+)$, $c_i^0(y_0^-)$, $c_i^0(z_0^+)$ and $c_i^0(z_0^-)$ are ESVs corresponding to the target positions at $(x_0, y_0+\epsilon, z_0)$, $(x_0, y_0-\epsilon, z_0)$, $(x_0, y_0, z_0-\epsilon)$ and $(x_0, y_0, z_0-\epsilon)$, respectively.

Simplifying Eq. (15) and Eq. (16) when the associated elevation angle is large yields:

$$\left.\frac{\partial t_i^t}{\partial y}\right|_0 = \frac{1}{c_i^0 + b_c^0} \frac{y_0 - y_i}{R_i^0} \tag{19}$$

and $$\left.\frac{\partial t_i^t}{\partial z}\right|_0 = \frac{1}{c_i^0 + b_c^0} \frac{z_0 - z_i}{R_i^0}. \tag{20}$$

The well known iterated Newton-Raphson method can now be applied. Referring now to FIG. 1, there is shown a flow chart of the method of the present invention. Writing the linearized N equations (Eq. 5) in five unknowns in matrix vector notation, step 100 yields:

$$J\Delta x = J\Delta R, \tag{21}$$

where J is the well known Jacobian matrix, formed using Equations 14, 19, 20, 8 and 9 for t with respect to x, y, z, $b_c$ and $b_t$, respectively, and using data points 1 ... N; $\Delta x$ is the state error vector; and $\Delta R$ is the difference between the measurement and the reference state vector. A first linearization point, $x_0, y_0, z_0, b_c^0, b_t^0$, is chosen to obtain the least squares estimate, given by:

$$\Delta \bar{x} = (J^T J)^{-1} J \Delta R, \tag{22}$$

as provided for in the Newton-Raphson method at step 200. The least squares estimate is added to the linearization point to yield an improved estimate at step 300. If the error vector is greater than a predetermined tolerance value, step 400 returns to step 100, using the updated parameter values. If the error vector is less than the predetermined tolerance value, step 400 exits with the improved estimate. As noted previously, computer algorithms for implementing the Newton-Raphson method for solving linear equations in multiple unknowns are well known in the art.

As also noted earlier, the term $$\left.\frac{\partial c_i}{\partial x}\right|_0$$

was taken to be negligibly small, especially for large elevation angles. In practice, the evaluation of the spatial dependence of $c_i$ is incorporated into the iteration of the linearized state variable and is performed automatically regardless of the elevation angle.

Figure 2:
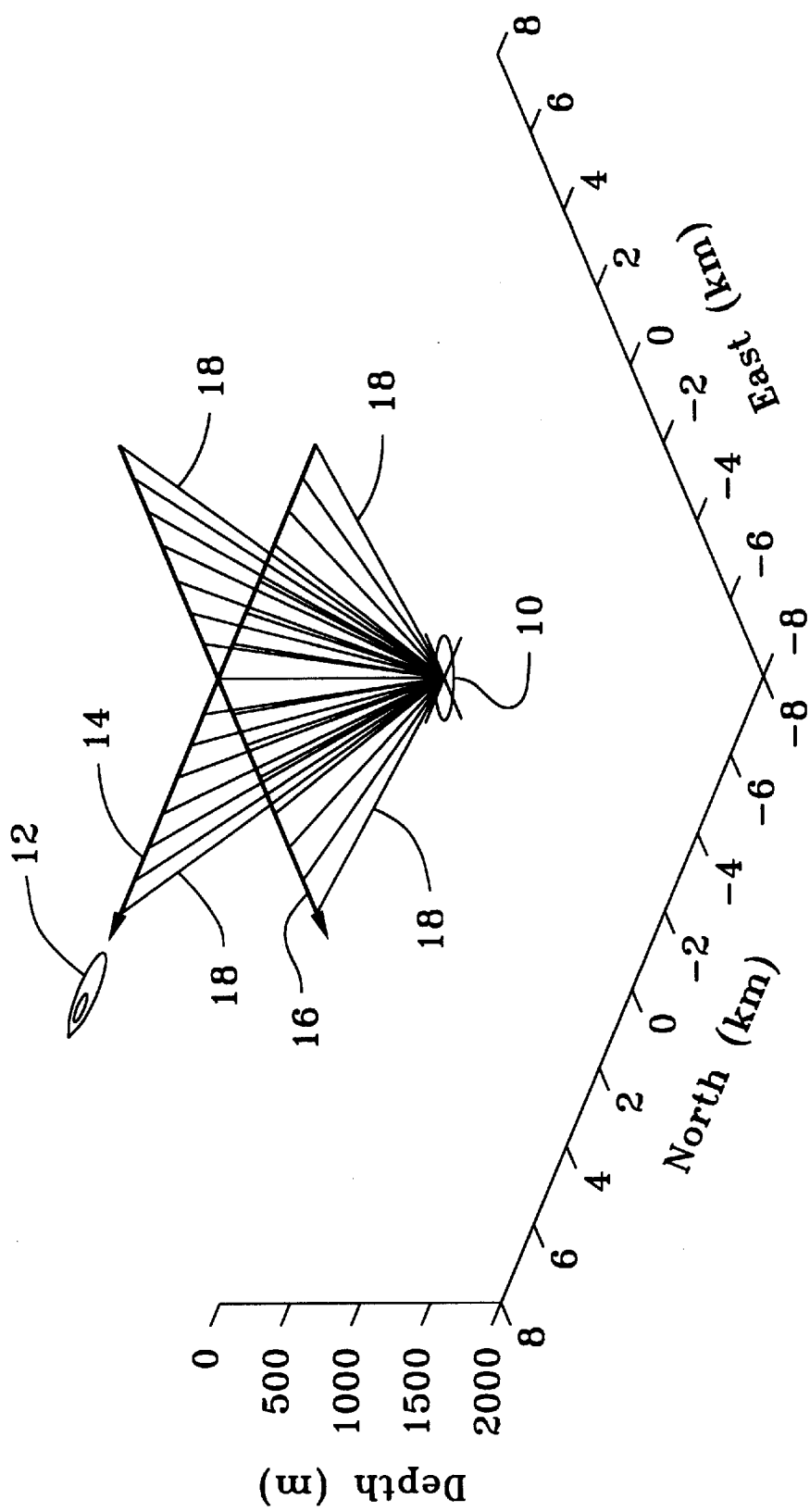
FIG. 2 is a schematic representation of a hydrophone location to be estimated.
Figure 3:
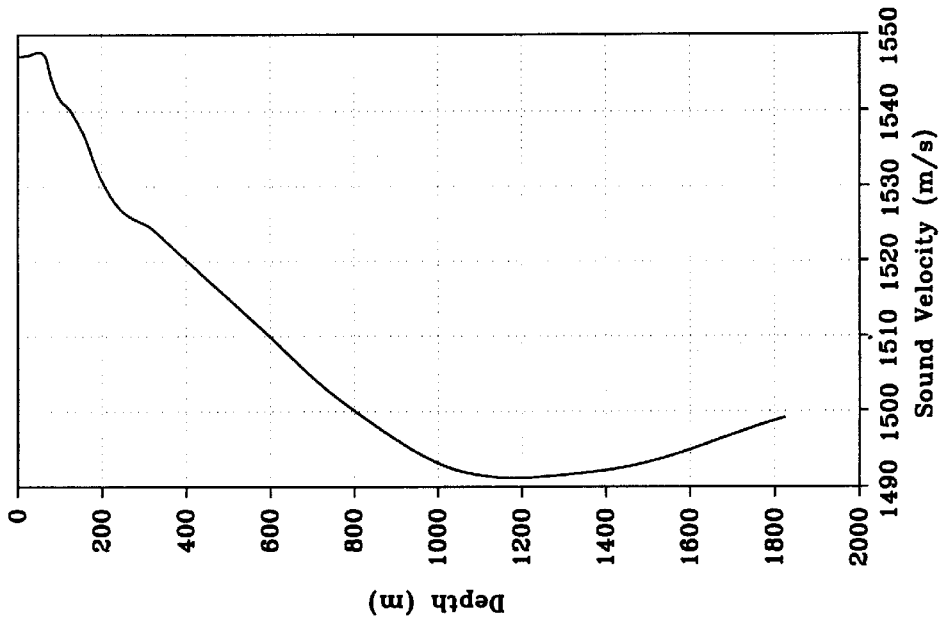
FIG. 3 is a Sound Velocity Profile corresponding to FIG. 2.

The following numerical simulation verifies the solution algorithm and clearly demonstrates the capability of this new method without the introduction of noise and uncertainty of field data. Referring to FIG. 2, consider hydrophone 10 cabled to shore (not shown) which is placed at a fixed location "L" on the seafloor such that its geodetic coordinates are 24.50° N latitude, 77.50° W longitude and an ellipsoid height of −1628.94 meters. The geoid height is known to be −28.94 meters, thus the hydrophone 10 depth (orthometric height) is −1600.00 meters. Assume that a surface vessel, or ship 12, transited on a ship path relative to the hydrophone as shown by arrows 14 and 16, where (without loss of generality) the coordinate system has been transformed to an East, North, Up local tangent plane coordinate system. The ship 12 is transmitting acoustic signals which propagate to hydrophone 10 as indicates by lines 18 in FIG. 2 and are detected by electronics (not shown) on shore. The signals correspond to data points 1 ... N for use in forming the Jacobian matrix. FIG. 3 shows a SVP plot for the area in question. Using this SVP as a true SVP, the true transit times from the ship 12 to hydrophone 10 at each position can be calculated. If a systematic timing bias error of 2 ms and an ESV bias error of 0.63 m/s is incorporated, a new set of (erroneous) acoustic transit times can be calculated. Starting from a reference location $(x_0, y_0, z_0)$ several hundred meters from the true location, the position of hydrophone 10 is estimated using both data sets and all three positioning models (spherical least squares, SLS; hyperbolic least squares, HLS; and the method of the present invention referred to as hyperbolic least squares with bias estimation, HLSBE) as summarized in Table 1 as follows:

TABLE 1

Numerical Simulation Results

| | Model | x(m) | y(m) | z(m) | $b_t$(ms) | $b_c$(m/s) |
|---|---|---|---|---|---|---|
| 1 | SLS | 0.00 | 0.00 | −1600.00 | — | — |
| 2 | HLS | 0.00 | 0.00 | −1600.00 | 0.0 | — |
| 3 | HLSBE | 0.00 | 0.00 | −1600.00 | 0.0 | 0.0 |
| 4 | SLS | 0.00 | 0.00 | −1606.78 | — | — |
| 5 | HLS | 0.00 | 0.00 | −1597.09 | 4.1 | — |
| 6 | HLSBE | 0.00 | 0.00 | −1600.00 | 2.0 | 0.63 |

Figure 4:
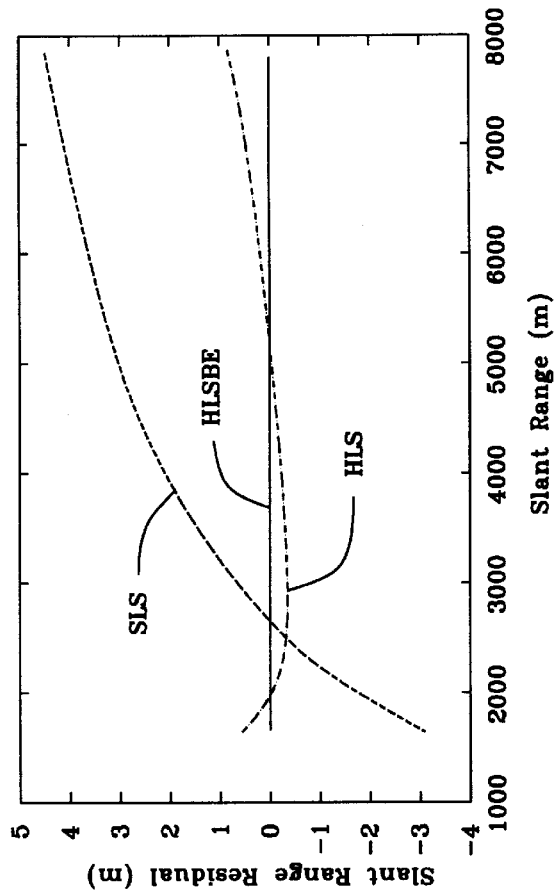
FIG. 4 is a Slant Range Residual Plot for data from FIGS. 2 and 3.

Estimates numbered 1 through 3 correspond with the three different positioning models for acoustic data containing no bias error. As shown in Table 1, if no biases are present, each positioning model and its associated solution algorithm is sufficient for estimating the sensor location. Estimates 4 through 6 utilize data having the timing delay and ESV bias. In this situation, however, only the method of the present invention, HLSBE, correctly estimates the sensor location in the presence of both a system timing bias and ESV bias. Traditionally, any systematic bias was estimated and eliminated through the analysis of slant range residuals. The residuals for estimates 4 through 6 associated with each model are shown in FIG. 4. Use of a residual plot shows that a bias is present, but gives no immediate insight as to the source or relative magnitude of the bias errors. Historically, errors were removed by undertaking a laborious and time consuming trial and error approach. The situation is further complicated for field data as the residual plot will have noise superimposed on any systematic trend event in the residuals. It is noted that the HLSBE model of the present invention yields not only a correct estimate for the sensor location, but also correct estimates for the timing and ESV biases.

The invention thus described provides an improved survey method for estimating the geodetic position of sensors placed at fixed but unknown locations on the sea floor developed. This method eliminates the largest sources of error, timing and sound velocity bias error, by considering them as additional unknown parameters to be estimated. The method is shown to be very robust and insensitive to the uncertainties of SVP and timing bias error when estimating acoustic sensor location from experimental field data. In addition to providing accurate estimates of geodetic position, the method also provides correct estimates for the timing and ESV biases. For this new method, as well as all previous methods, care must be taken to simultaneously ensure that the measurements, mathematical model, and solution algorithm are compatible. Specifically, the new method will usually require a wider spatial coverage while collecting time of arrival measurements, because the successful use of this new model needs diverse effective sound velocities associated with those measurements.

Although the present invention has been described relative to a specific embodiment thereof, it is not so limited. For example, as noted previously, higher order terms could be added to the model if the mathematical nature of the ESV error so dictated.

Thus, it will be understood that many additional changes in the details and steps which have been herein described and illustrated in order to explain the nature of the invention, may be made by those skilled in the art within the principle and scope of the invention as expressed in the appended claims.

What is claimed is:

1. A method for estimating the geodetic position of an underwater acoustic sensor comprising the steps of:
   obtaining a slant range R data set for the underwater sensor from a series of signals transmitted to the sensor; and
   using the slant range data set to solve for the geodetic position using the expression $$R_i = (c_i + b_c)(t_i^a - t_i^e + b_t),$$

where $c_i$ denotes an Effective Sound Velocity (ESV) of the signals, $b_c$ denotes a bias error in the ESV, $t_i^a$ and $t_i^e$ are arrival and emission times of the signal, respectively, and $b_t$ denotes a timing bias error.

2. The method of claim 1 wherein the solving step further comprises the steps of:
   inputting the slant range data set into a memory of a computer;
   using the computer to perform an iterated Newton-Raphson analysis on the data set within the memory; and
   outputting the result of the iterated Newton-Raphson analysis as the geodetic position of the sensor.

3. The method of claim 2 wherein the iterated Newton-Raphson analysis is performed using developed expressions for $$t_i^t = t_0^t + \frac{\partial t_i^t}{\partial x}\bigg|_0 (x - x_0) + \frac{\partial t_i^t}{\partial y}\bigg|_0 (y - y_0) + \frac{\partial t_i^t}{\partial z}\bigg|_0 (z - z_0) +$$
$$\frac{\partial t_i^t}{\partial b_c}\bigg|_0 (b_c - b_c^0) + \frac{\partial t_i^t}{\partial b_t}\bigg|_0 (b_t - b_t^0),$$

$$\frac{\partial t_i^t}{\partial x}\bigg|_0 = \frac{1}{c_i^0 + b_c^0} \frac{x_0 - x_i}{R_i^0},$$

$$\frac{\partial t_i^t}{\partial y}\bigg|_0 = \frac{1}{c_i^0 + b_c^0} \frac{y_0 - y_i}{R_i^0},$$

$$\frac{\partial t_i^t}{\partial z}\bigg|_0 = \frac{1}{c_i^0 + b_c^0} \frac{z_0 - z_i}{R_i^0},$$

$$\frac{\partial t_i^t}{\partial b_c}\bigg|_0 = -\frac{R_i^0}{(c_i^0 + b_c^0)^2} \text{ and}$$

$$\frac{\partial t_i^t}{\partial b_t}\bigg|_0 = -1,$$

where x, y and z are geodetic position coordinates of the sensor.

4. The method of claim 3 wherein the iterated Newton-Raphson analysis performing step further comprises the steps of:
   writing the developed expressions in matrix vector notation;
   choosing first linearization point values for parameters in the expression;
   obtaining a least squares estimate for an error vector component of the matrix vector based on the linearization point values;
   adding the least squares estimate to the linearization point values to obtain iterated linearization point values;
   determining if the least squares estimate is within a predetermined tolerance;
   returning to the least squares obtaining step when the least squares estimate is not within the predetermined tolerance; and
   providing the iterated linearization point values to the outputting step when the least squares estimate is within the predetermined tolerance.

5. The method of claim 2 wherein the iterated Newton-Raphson analysis performing step further comprises the steps of:

choosing first linearization point values for parameters in the expression;

obtaining a least squares estimate of errors in the data set analysis based on the linearization point values;

adding the least squares estimate to the linearization point values to obtain iterated linearization point values;

determining if the least squares estimate is within a predetermined tolerance;

returning to the least squares estimate obtaining step when the least squares estimate is not within the predetermined tolerance; and providing the iterated linearization point values to the outputting step when the least squares estimate is within the predetermined tolerance.

6. The method of claim 1 wherein the solving step further comprises the steps of:

inputting the slant range data set into a memory of a computer;

using the computer to perform an analysis on the data set within the memory to obtain a solution to a system of non-linear equations represented by the expression; and outputting the result of the analysis as the geodetic position of the sensor.

* * * * *